(12) United States Patent
Deragården

(10) Patent No.: US 11,679,722 B2
(45) Date of Patent: Jun. 20, 2023

(54) METHOD FOR ADJUSTING A DISPLAY VIEW OF A VISION AID SYSTEM

(71) Applicant: VOLVO TRUCK CORPORATION, Gothenburg (SE)

(72) Inventor: Hans Deragården, Kullavik (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/425,206

(22) PCT Filed: Jan. 30, 2019

(86) PCT No.: PCT/EP2019/052189
§ 371 (c)(1),
(2) Date: Jul. 22, 2021

(87) PCT Pub. No.: WO2020/156648
PCT Pub. Date: Aug. 6, 2020

(65) Prior Publication Data
US 2022/0080893 A1    Mar. 17, 2022

(51) Int. Cl.
*H04N 13/204*   (2018.01)
*H04N 23/69*    (2023.01)
(Continued)

(52) U.S. Cl.
CPC .............. *B60R 1/28* (2022.01); *G08G 1/0112* (2013.01); *H04N 13/204* (2018.05);
(Continued)

(58) Field of Classification Search
CPC .... B60R 1/28; G08G 1/0112; H04N 5/23216; H04N 5/232127; H04N 23/62; H04N 23/69; H04N 23/695; H04N 23/675
See application file for complete search history.

(56) References Cited

U.S. PATENT DOCUMENTS 9,387,854 B1    7/2016  Ferguson et al.
10,935,978 B2 *  3/2021  Yalla ................. G01C 21/3407
(Continued)

FOREIGN PATENT DOCUMENTS

CN    1959349 A    5/2007
CN    105373944 A   3/2016
(Continued)

OTHER PUBLICATIONS

International Search Report and Written Opinion dated Jul. 9, 2019 in corresponding International PCT Application No. PCT/EP2019/052189, 9 pages.
China Office Action dated Feb. 17, 2023 in corresponding China Patent Application No. 201980083408.0, 14 pages.

*Primary Examiner* — Rowina J Cattungal
(74) *Attorney, Agent, or Firm* — Venable LLP; Jeffri A. Kaminski

(57) ABSTRACT

The invention relates to a method for adjusting a display view of a vision aid system (1) of a vehicle (10), the method comprising the following steps: —(S1) identifying a specific situation when the vision aid system should be utilized; —(S2) receiving a display view setting for the specific situation, wherein the display view setting is based on at least one previous display view setting from at least one other vision aid system of another vehicle which has experienced the specific situation, wherein the at least one previous display view setting relates to the specific situation; and —(S3) adjusting the display view of the vision aid system (1) in accordance with the received display view setting. The present invention also relates to a system, to a method for receiving and transmitting display view settings to a fleet of vehicles (100) having vision aid systems, to a system (20) for receiving and transmitting display view settings to a fleet of vehicles (100), to a computer program (Continued)

and/or to a computer readable medium carrying the computer program.

19 Claims, 4 Drawing Sheets

(51) Int. Cl.
*H04N 23/67* (2023.01)
*H04N 23/695* (2023.01)
*B60R 1/28* (2022.01)
*H04N 23/62* (2023.01)
*G08G 1/01* (2006.01)

(52) U.S. Cl.
CPC ........... *H04N 23/62* (2023.01); *H04N 23/675* (2023.01); *H04N 23/69* (2023.01); *H04N 23/695* (2023.01)

(56) References Cited

U.S. PATENT DOCUMENTS

| | | | |
|---|---|---|---|
| 10,970,746 B2 * | 4/2021 | Singhal | G01S 13/865 |
| 2018/0127001 A1 | 5/2018 | Ricci | |
| 2019/0383631 A1 * | 12/2019 | Bigio | G06V 20/59 |

FOREIGN PATENT DOCUMENTS

| | | |
|---|---|---|
| CN | 107284356 A | 10/2017 |
| CN | 108337477 A | 7/2018 |
| CN | 108920717 A | 11/2018 |
| DE | 102013020875 A1 | 6/2015 |
| JP | 2014238844 A | 12/2014 |
| WO | 2016109082 A1 | 7/2016 |
| WO | 2017048581 A1 | 3/2017 |

* cited by examiner

METHOD FOR ADJUSTING A DISPLAY VIEW OF A VISION AID SYSTEM

CROSS-REFERENCE TO RELATED APPLICATIONS

This application is a U.S. National Stage application of PCT/EP2019/052189, filed Jan. 30, 2019, and published on Aug. 6, 2020, as WO 2020/156648 A1, all of which is hereby incorporated by reference in its entirety.

TECHNICAL FIELD

The invention relates to a method for adjusting a display view of a vision aid system of a vehicle. The invention furthermore relates to a vision aid system for a vehicle, to a method for receiving and transmitting display view settings to a fleet of vehicles having vision aid systems, to a system for receiving and transmitting display view settings to a fleet of vehicles, to a computer program and/or to a computer readable medium carrying the computer program.

The invention can be applied in heavy-duty vehicles, such as trucks, buses and construction equipment. Although the invention will be described with respect to a heavy-duty truck, the invention is not restricted to this particular vehicle, but may also be used in other vehicles such as light-weight trucks, articulated haulers, excavators, wheel loaders, and backhoe loaders.

BACKGROUND

Surround view systems and other vision aid systems are becoming more common in vehicles every day, mainly because of safety-, security- and efficiency reasons. Simple vision aid systems typically comprise a reverse camera and a display while more advanced systems might include several cameras, image processing, such as stitching of video images and processing of video images for object recognition and classification. Three-dimensional (3D) imaging systems are also becoming more common, where the position and zoom of a virtual camera may be selected. There are many possibilities to vary the display output of these systems.

There are almost an endless number of possibilities to configure functions and the content of the display(s) for best driving support, but it is often difficult and time consuming to adjust settings according to the current or upcoming situations. When driving in dense traffic this time is often not available or it may significantly impact on safety and driver comfort.

It is know that vision aid systems can provide automatic change of display view settings to show a specific camera view which is triggered by e.g. activation of a turning signal or selection of a reverse gear. A drawback with this is that the system adjustment of the visual support is done and becomes available after the decision to turn, change lane and/or the reversing already is started/completed.

SUMMARY

In view of the above, an object of the invention is to provide an improved method, vision aid system and/or a vehicle comprising a vision aid system, which provides improved support to a user of the vehicle.

According to a first aspect, the object is achieved by a method according to claim 1. According to a second aspect, the object is achieved by a vision-aid system according to claim 11. According to a third aspect, the object is achieved by a vehicle according to claim 14. According to a sixth aspect, the object is achieved by a computer program according to claim 16. According to a seventh aspect, the object is achieved by a computer readable medium comprising a computer program according to claim 19. Further advantages and advantageous features of the invention are disclosed in the following description and in the dependent claims.

According to the first aspect thereof, the object is achieved by a method for adjusting a display view of a vision aid system of a vehicle, the method comprising the following steps:
   identifying a specific situation when the vision aid system should be utilized;
   receiving a display view setting for the specific situation, wherein the display view setting is based on at least one previous display view setting from at least one other vision aid system of another vehicle which has experienced the specific situation, wherein the at least one previous display view setting relates to the specific situation; and
   adjusting the display view of the vision aid system in accordance with the received display view setting.

By the provision of the method as disclosed herein, an improved adjustment of a display view of a vision aid system of a vehicle is provided. More particularly, by using the experience from at least one other vehicle which has already been in the same corresponding specific situation and which has adjusted its/their own display view setting in accordance with the specific situation, this/these display view setting(s) can be used for the vehicle which has not yet experienced the specific situation. By receiving this/these previous display view setting(s) when the vehicle for the first time experiences the specific situation and then adjusting the display view accordingly, the adjustment may for example be made earlier in time. Thereby the vision aid system may be able to provide improved support for the user of the vehicle during the specific situation. In addition, the adjustment may be made such that it optimizes the display view based on the earlier experience(s) from the at least one other vehicle which has/have been in the specific situation. For example, the previous display view setting(s) may have been set such that it/they provided specific attention to an object, which may be an obstacle, a curb or anything else that may be helpful for the user of the vehicle to view on the display when being in the specific situation.

The expression "display view" as used herein means an image view which is presented by a display unit of the vision aid system of the vehicle. The display unit may for example be a display screen located on or in the vicinity of a vehicle dashboard, but it may also for example be a hand-held display unit which can be used by the user of the vehicle. In general, a display unit is a unit which is configured for presenting visual information to a user of the vehicle.

The expression "display view setting" as used herein means a setting, e.g. a configuration, of the display view presented to the user of the vehicle.

The expression "specific situation" as used herein means a situation which a vehicle is experiencing and/or is exposed to, such as when driving on a certain road section, when performing a certain task or the like.

Optionally, the display view setting may correspond to the at least one previous display view setting with at least one added correction parameter. By using a correction parameter, the display view setting may be adjusted such that it fits to the vehicle and/or the user of the vehicle which is in the specific situation. It has namely been realized that a previous display view setting may need to be adjusted to fit the current vehicle when it is exposed to the specific situation. Therefore, and optionally, the at least one correction parameter may be indicative of any one of a user preference, a characteristic of the vision aid system and characteristic of the vehicle. Still optionally, the method may further comprise the step of receiving the user preference(s) by at least one manual input from a user of the vehicle. Hence, the user of the vehicle may decide when and how the display view settings may be adjusted, thereby further improving and customizing the display view settings to the specific user. According to one example embodiment, the method may further comprise the step of analysing more than one manual input from the user over time, and therefrom provide a correction parameter which corresponds to the more than one manual input from the user over time. Just as a matter of example, the manual input over time may be used for providing an average value for the user preference, and then use the average value as a correction parameter for correcting/adjusting the previous display view setting. As another non-limiting example, a statistical evaluation may be performed on the manual input over time, and from this a correction parameter may be provided. For example, the statistical evaluation may be part of a machine learning algorithm, which learns which is the most preferred display view setting for a user.

Optionally, the specific situation may comprise a sequence of steps exposed to the vehicle, wherein the display view setting comprises a corresponding sequence of specific display views associated to the sequence of steps. Hence, the display view setting may comprise one display view setting which is fixed during the specific situation or the display view setting may be adjusted during the specific situation in accordance with a sequence of steps exposed to the vehicle during the specific situation. The sequence of steps during the specific situation may for example be a specific task which the vehicle performs, such as a working task of a construction equipment vehicle or a truck. Purely by way of example, the sequence of steps may be when a truck is loading and/or unloading material, such as a dump truck unloading its material on a ground surface behind the truck. During such a specific situation, the display view setting may need to be adjusted in accordance with e.g. a tipping sequence.

Optionally, the display view setting may comprise information about at least one of the following: center of focus of a sensor view of the vision aid system, zoom level of the sensor view, covered area of the sensor view, direction of the sensor view in relation to vehicle orientation and direction of the sensor view in relation to a user position with respect to the vehicle.

Optionally, the display view setting may be configured such that the display view presented to the user comprises means for the user to control specific parameters of the vehicle. The means may be optimized/adapted for the specific situation and/or appear on the screen just before or during the specific situation. This may for example be push buttons or the like provided on a touch screen for controlling a tipping sequence of a vehicle tipper body. As another example, the means may be push buttons or the like provided on the touch-screen for controlling a crane or an excavator arm of the vehicle. As yet another example, the means may be controls provided on the touch-screen such that the user can control zoom level of the image view and/or a height level of an air suspension system of the vehicle etc.

Optionally, the identified specific situation may be at least one of a geographical position of the vehicle and/or of the vision aid system, a geographical area in which the vehicle and/or the vision aid system is located, a specific orientation of the vehicle with respect to an object, a specific mission that the vehicle is conducting, a specific time and/or date, a vehicle status and a specific route on which the vehicle is travelling, an environmental condition, such as weather and ambient light level.

Optionally, the method may further comprise the step of receiving the previous display view setting and/or the display view setting from at least one other vehicle, an external database, a cloud-based service, a database of the vehicle, or the like.

Optionally, the display view setting may be based on a compiled set of previous display view settings from a plurality of other vision aid systems of other vehicles which has experienced the specific situation. For example, the compiled set of previous display view settings may be analysed, and therefrom the most frequently used display view setting for the specific situation may be selected. Alternatively, as another example, an average value and/or a median value of the compiled set of previous display view settings may be used. Thereby, a more optimized display view setting may be provided for a user of the vehicle when being in the specific situation.

According to the second aspect thereof, the object is achieved by a vision aid system for a vehicle, comprising: a sensor system comprising at least one sensor for generating an image view of at least a portion of a surrounding of the vehicle, at least one display unit for displaying the image view, and a control unit configured to perform the steps of the method according to any one of the embodiments of the first aspect of the invention. It shall be noted that all embodiments of the first aspect are applicable to all embodiments of the second aspect and vice versa. The advantages of the second aspect are analogous to the advantages of the first aspect.

Optionally, the sensor system may be any one of a camera system comprising at least one camera, a LIDAR system comprising at least one LIDAR sensor and a RADAR system comprising at least one RADAR sensor.

Optionally, the sensor system may be a three-dimensional sensor system for generating a three-dimensional image of at least a portion of the surrounding of the vehicle, preferably a 360 degrees three-dimensional image around the vehicle. Just as a matter of example, the three-dimensional sensor system may be a three-dimensional camera system.

Optionally, the vision aid system may further comprise a communication unit configured for receiving and/or transmitting display view settings, preferably in the form of a wireless receiver and/or transmitter.

According to the third aspect thereof, the object is achieved by a vehicle comprising the vision aid system according to any one of the embodiment of the second aspect. It shall be noted that all embodiments of the first and second aspects are applicable to all embodiments of the third aspect and vice versa. The advantages of the third aspect are analogous to the advantages of the first and second aspects.

Optionally, the vehicle may be a commercial vehicle, such as any one of a truck, such as a heavy duty truck, a construction equipment vehicle, and a bus.

Another object of the present invention is to provide an improved method and/or system for receiving and transmitting display view settings to a fleet of vehicles, resulting in improved support to a user of a vehicle.

According to a fourth aspect, the object is achieved by a method according to claim 16. According to a fifth aspect, the object is achieved by a system according to claim 17. According to the sixth aspect, the object is achieved by a computer program according to claim 16. According to the seventh aspect, the object is achieved by a computer readable medium comprising a computer program according to claim 19. Further advantages and advantageous features of the invention are disclosed in the following description and in the dependent claims.

According to the fourth aspect thereof, the object is achieved by a method for receiving and transmitting display view settings to a fleet of vehicles having vision aid systems, the method comprising the following steps:

receiving at least one display view setting from at least one vehicle, which at least one display view setting is associated with a specific situation for the at least one vehicle, transmitting the at least one display view setting with the associated specific situation to at least one other vehicle, wherein the at least one other vehicle can adjust a display view of its vision aid system in accordance with the at least one display view setting when it is identified that the at least one other vehicle is experiencing the specific situation. It shall be noted that all embodiments of the first, second and third aspects are applicable to all embodiments of the fourth aspect and vice versa. The advantages of the fourth aspect are analogous to the advantages of the first, second and third aspects.

According to the fifth aspect thereof, the object is achieved by a system for receiving and transmitting display view settings to a fleet of vehicles, comprising means for receiving and transmitting display view settings and a control unit configured to perform the steps of the method according to any one of the embodiments of the fourth aspect. It shall be noted that all embodiments of the first, second, third and fourth aspects are applicable to all embodiments of the fifth aspect and vice versa. The advantages of the fifth aspect are analogous to the advantages of the first, second, third and fourth aspects.

According to the sixth aspect thereof, the objects are achieved by a computer program comprising program code means for performing the steps of any one of the methods according to the first and fourth aspects of the invention, when said program is run on a computer.

According to the seventh aspect thereof, the objects are achieved by a computer readable medium carrying a computer program comprising program code means for performing the steps of any one of the methods according to the first and fourth aspects of the invention, when said program product is run on a computer.

BRIEF DESCRIPTION OF THE DRAWINGS

With reference to the appended drawings, below follows a more detailed description of embodiments of the invention cited as examples.

In the drawings.

Figure 1:
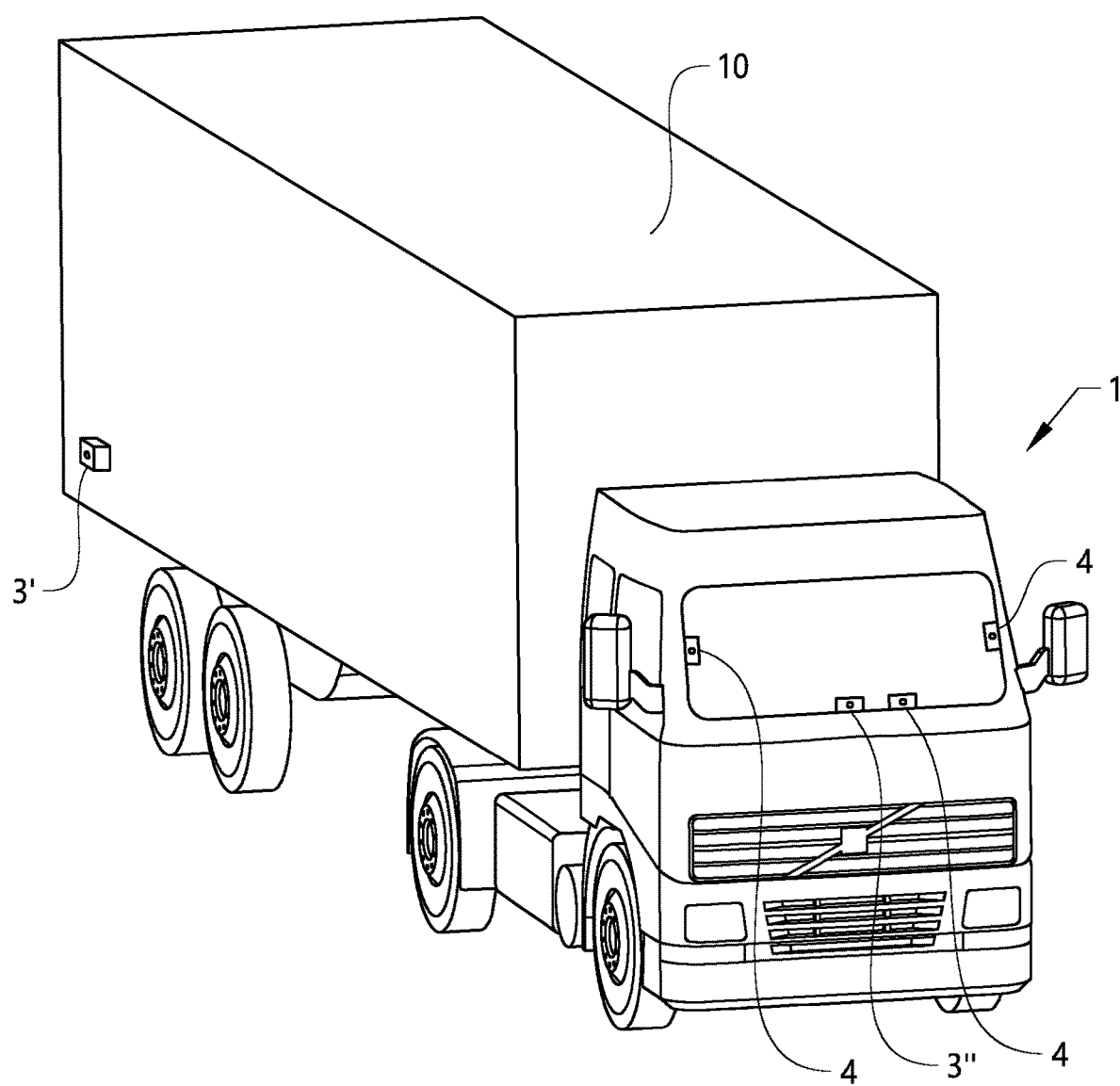
FIG. 1 shows a perspective view of a truck comprising a vision aid system according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

In FIG. 1, a front perspective view of a vehicle 10 comprising a vision aid system 1 is shown. The vehicle is in this embodiment a heavy-duty truck. The vision aid system 1 comprises a sensor system 3', 3" which here is a camera system with more than one camera for generating an image view of at least a portion of a surrounding of the truck 10. In the figure, two cameras 3' and 3" can be seen, where one of the cameras, 3', is located on the right-hand side of the truck 10, as seen in the truck's traveling direction, and another one of the cameras, 3", is located at the front of the truck 10. More particularly, in this embodiment, the camera 3" is located behind the truck's windscreen and facing outwardly from the truck's front. The vision aid system 1 further comprises at least one display unit 4 for displaying the image view, and a control unit (not shown) configured to perform the steps of the method according to any one of the embodiments of the first aspect of the invention. The truck 10 as shown in FIG. 1 comprises three display units 4 located in the truck's user cabin. The display units 4 may for example be display screens provided on the dashboard (not shown) in the cabin and/or on the left and right sides in the cabin. The control unit may be a processing unit located anywhere in the truck 10. It may for example be a processing unit which is also used for performing other tasks of the truck 10. The processing unit may also be connected to a memory unit, in which a computer program according to the sixth aspect of the invention may be stored, and used by the processing unit to perform the steps of the method. According to an example embodiment, the display units 4 may be part of a human and machine interface (HMI), comprising at least one output, which may be the visual output from the screen, and at least one human input. The at least one human input may for example be a keyboard, or the like, a touchscreen etc. In one example embodiment, the human input may be used for entering a user preference. According to an example embodiment of the present invention, a user preference may be entered before and/or during the specific situation. Preferably, the user preference is entered before, thereby avoiding any unnecessary disturbance during the specific situation.

Figure 2:
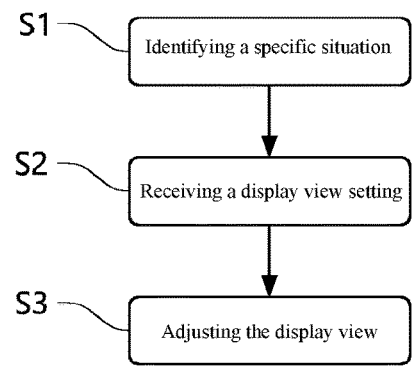
FIG. 2 shows a flowchart of a method according to an example embodiment of the first aspect of the invention.

Now, with respect to FIGS. 1 and 2, an embodiment of the method according to the present invention will be described.

In a first step, S1, the control unit of the truck 10 identifies a specific situation when the vision aid system 1 should be utilized. The identification of the specific situation may be done in different ways. For example, the truck may comprise a GNSS (Global Navigation Satellite System) system (not shown) which identifies the geographical position of the truck. Examples of GNSS systems are GPS, GLONASS and Galileo. The position may be mapped with a list of pre-known positions which are stored in e.g. a database. The database may be located in the truck and/or it may be remotely located, such as for example comprised in a so called cloud-based service. Based on the position, it may be identified that the vision aid system 1 should be utilized.

In the example shown in FIG. 1, the truck 10 is driving on a narrow road section located between two buildings, where there is a curb located on the left side of the truck, and wherein the curb cannot be immediately seen from the driver's cabin. Based on the identified position of the truck 10 associated with when the vision aid system 1 should be utilized, the control unit, in a second step S2, receives a display view setting for the specific situation. The display view setting is based on at least one previous display view setting from at least one other vision aid system of another vehicle which has experienced the specific situation, wherein the at least one previous display view setting relates to the specific situation. More particularly, the at least one previous display view setting is in this example configured to provide an image of the curb on the left-hand side of the truck 10.

Based on the at least one previous display view setting, the control unit adjusts the display view of the display unit 4 in a step S3 such that an image view of the curb is provided to the user. Thereby the user, in this case the driver of the truck 10, may avoid hitting the curb by watching the image view provided by the display unit 4. The adjustment may according to an example embodiment be performed automatically without any direct involvement from the user, such as during the initial phase and/or during the entire phase of the specific situation.

In the case there is more than one previous display view setting for the specific situation, in this example the narrow road section, these previous display view settings may be different. For example, one of the previous display view settings may be configured to focus on the curb, whilst another previous display view setting may be configured to focus on the right-hand side of the vehicle, due to that there is another obstacle on the right-hand side. In this case, the display view setting for the vision aid system 1 may, based on the previous display view settings, be configured to provide images of both the left-hand side and the right-hand side. Alternatively, the display view setting may be configured to provide an image in accordance with the most frequently used previous display view setting. For example, it may be concluded that the other vision aid systems which have been in the narrow road section most frequently provided an image on the left-hand side of the vehicle.

Figure 3:
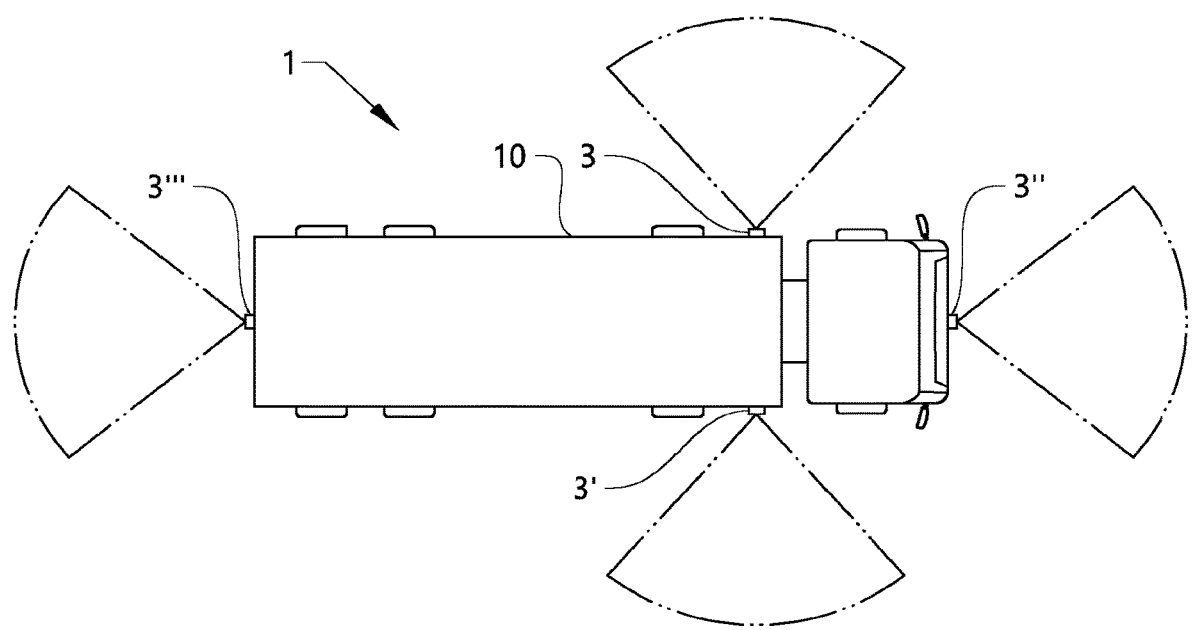
FIG. 3 shows a truck seen from above comprising a vision aid system according to an example embodiment of the present invention.

In FIG. 3, a truck 10 is shown from above, where the truck comprises a vision aid system 1 having four cameras, 3, 3', 3" and 3". The cameras are provided on all four sides of the truck, and are thereby able to generate a 360-degrees camera view around the truck. The vision aid system 1 comprises at least one display unit (not shown) and a control unit (not shown) for performing the steps of the method according to the first aspect of the invention.

Figure 4:
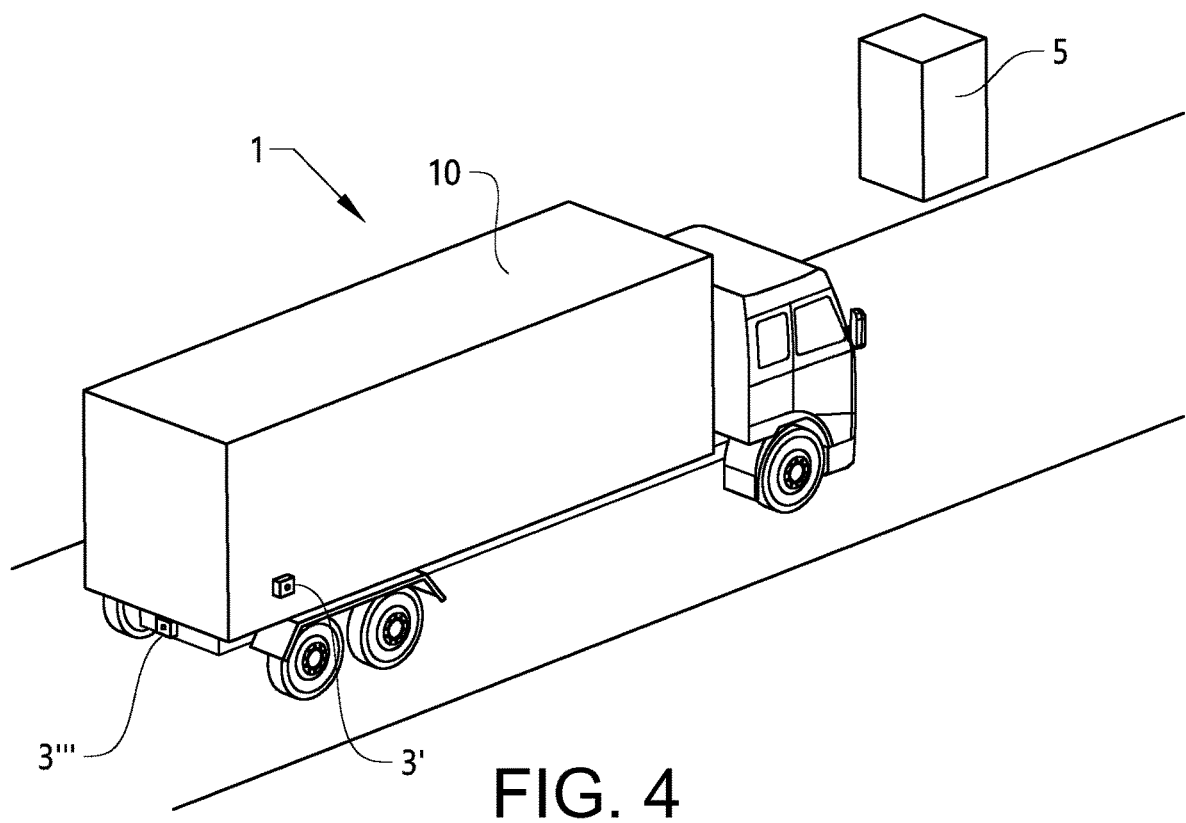
FIG. 4 shows a perspective view of a truck comprising a vision aid system according to another example embodiment of the present invention.
Figure 5:
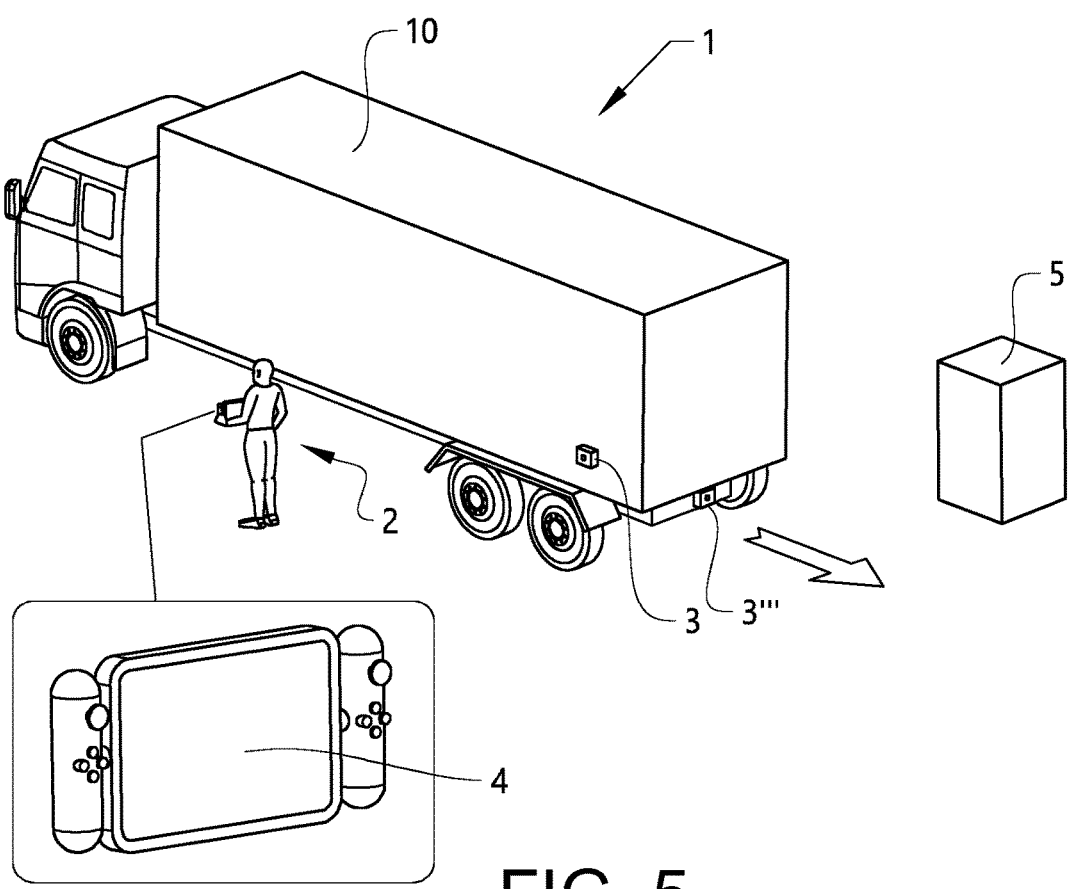
FIG. 5 shows a perspective view of a truck comprising a vision aid system according to another example embodiment of the present invention.

In FIGS. 4 and 5, two different specific situations for a vehicle 10 are shown. Each one of the specific situations corresponds to a geographical position and to at least one of a vehicle status and an orientation of the vehicle with respect to an obstacle 5. The vehicle status may be that the vehicle is either driving forward or rearward. The orientation of the vehicle with respect to the obstacle 5 may be that the vehicle is either provided with its front facing the obstacle 5, FIG. 4, or with its rear facing the obstacle 5, FIG. 5. Depending on the circumstances of the specific situation, the display view is adjusted accordingly, and based on previous display view settings from at least one other vision aid system of another vehicle which has been in the same respective specific situations.

Further in FIG. 5 it is also shown that a user 2 may operate the vehicle from the outside by a remote HMI unit comprising a display unit 4 which is wirelessly connected to the vision aid system 1 of the vehicle 10. Thereby, depending on the user position 2 with respect to the vehicle 10, the camera view may for example be directed towards obstacles 5 which are hidden for the user and/or which are important for the user in order to successfully perform its mission. The display view setting of the display unit 4 is based on at least one previous display view setting from another vision aid system which has experienced the specific situation. According to an example embodiment, the display view setting may also comprise information such as distance to an object, speed of the vehicle or the like. Hence, the display view setting may also comprise other information than image-information.

Figure 6:
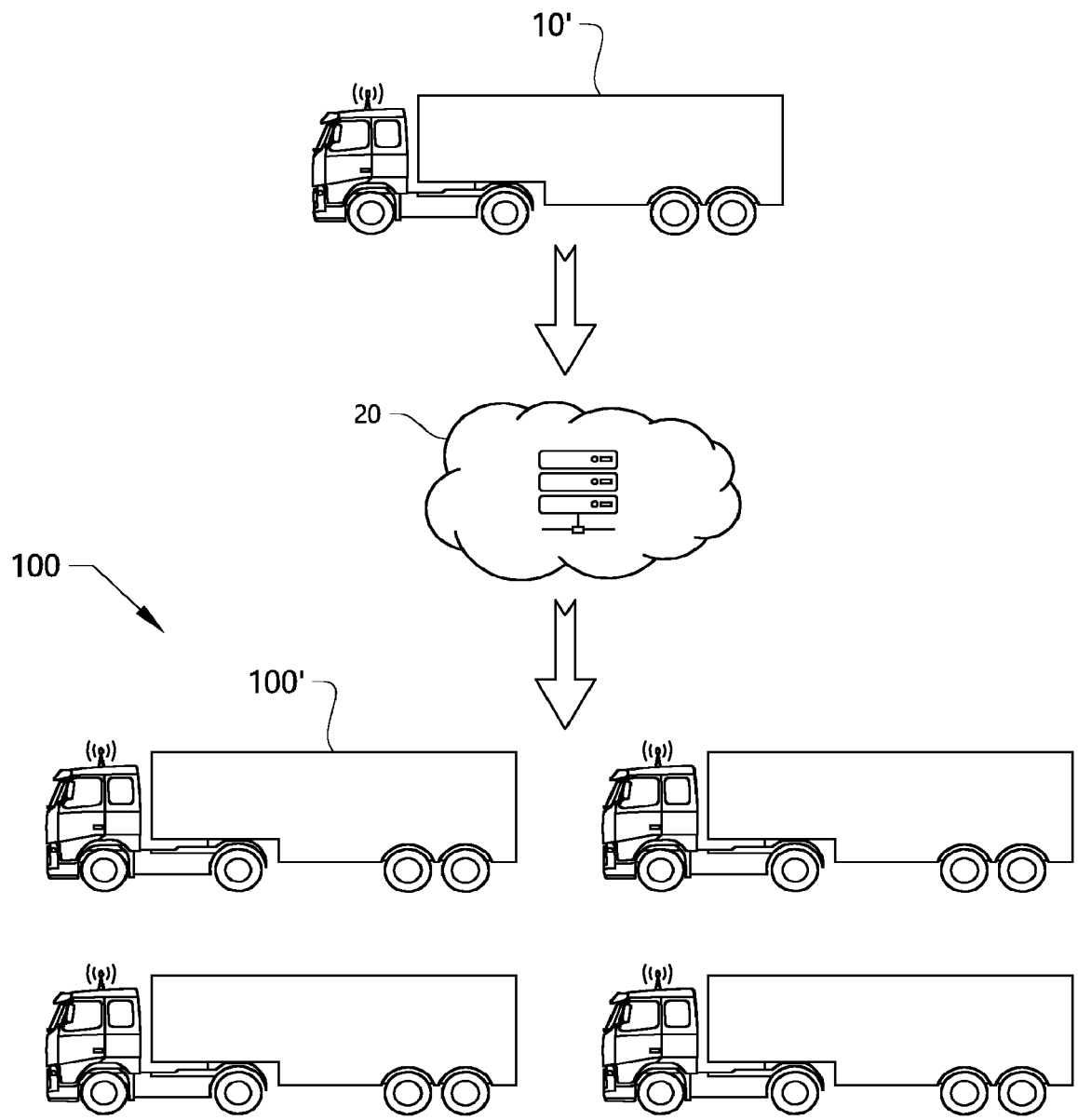
FIG. 6 shows a system for receiving and transmitting display view settings according to an example embodiment of the present invention.
Figure 7:
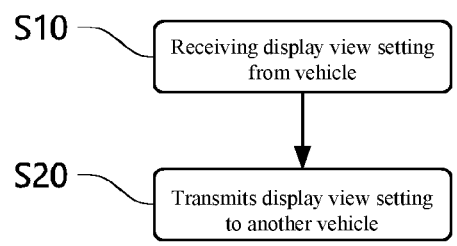
FIG. 7 shows a flowchart of a method for receiving and transmitting display view settings according to an example embodiment of the present invention.

FIGS. 6 and 7 relate to embodiments of the fourth and fifth aspects of the invention. FIG. 6 shows a system 20 and FIG. 7 shows a flowchart of an example embodiment of the method. The system is configured for receiving and transmitting display view settings to a fleet of vehicles 100. The fleet of vehicles 100 are in this example a plurality of heavy-duty trucks. The system 20 comprises means for receiving and transmitting display view settings. In this embodiment, the means are a wireless receiver and transmitter (not shown) which is configured for communicating with the fleet of vehicles 100, including the truck 10' and the truck 100'. The wireless communication may be done with any known wireless technology, such as for example via 3g, 4g, 5g or the like. According to one example embodiment, the system 20 may be a so called cloud-based system where information is stored remotely from the fleet of vehicles 100. The system further comprises a control unit (not shown) which is configured to perform the steps of the method as shown in e.g. FIG. 7. The method comprises a first step S10 of receiving at least one display view setting from at least one vehicle 10', which at least one display view setting is associated with a specific situation for the at least one vehicle 10'. As described in the above, the situation can be any type of situation, such as when being at a certain geographical location or when the vehicle is conducting a specific mission, such as loading and/or unloading a load. In a second step S20 the system 20 transmits the at least one display view setting with the associated specific situation to at least one other vehicle 100', wherein the at least one other vehicle 100' can adjust a display view of its vision aid system in accordance with the at least one display view setting when it is identified that the at least one other vehicle 100' is experiencing the specific situation.

It is to be understood that the present invention is not limited to the embodiments described above and illustrated in the drawings; rather, the skilled person will recognize that many changes and modifications may be made within the scope of the appended claims.

The invention claimed is:

1. A method for adjusting a display view of a vision aid system of a vehicle, wherein the vision aid system comprises a display unit for a user of the vehicle, the display unit being configured for presenting the display view to a user of the vehicle, the display view representing an image view of at least a portion of the surrounding of the vehicle, the method comprising: identifying a specific situation when the vision aid system should be utilized; receiving a display view setting for the specific situation, the display view setting being a setting of the display view identifying the image view that is presented to the user of the vehicle, wherein the display view setting is based on at least one previous display view setting from at least one other vision aid system of another vehicle which has experienced the specific situation, wherein the at least one previous display view setting relates to the specific situation; and adjusting the display view of the vision aid system in accordance with the received display view setting to display the identified image view.

2. The method according to claim 1, wherein the display view setting is corresponding to the at least one previous display view setting with at least one added correction parameter.

3. The method according to claim 2, wherein the at least one correction parameter is indicative of any one of a user preference, a characteristic of the vision aid system and a characteristic of the vehicle.

4. The method according to claim 3, further comprising the step of receiving the user preference by at least one manual input from a user of the vehicle.

5. The method according to claim 4, wherein the method further comprises the step of analyzing more than one manual input from the user over time, and therefrom provide a correction parameter which corresponds to the more than one manual input from the user over time.

6. The method according to claim 1, wherein the specific situation comprises a sequence of steps exposed to the vehicle, wherein the display view setting comprises a corresponding sequence of specific display views associated to the sequence of steps.

7. The method according to claim 1, wherein the display view setting comprises information about at least one of the following: center of focus of a sensor view of the vision aid system, zoom level of the sensor view, covered area of the sensor view, direction of the sensor view in relation to vehicle orientation and direction of the sensor view in relation to a user position with respect to the vehicle.

8. The method according to claim 1, wherein the identified specific situation is at least one of a geographical position of the vehicle and/or of the vision aid system, a geographical area in which the vehicle and/or the vision aid system is located, a specific orientation of the vehicle with respect to an object, a specific mission that the vehicle is conducting, a specific time and/or date, a vehicle status and a specific route which the vehicle is travelling on, an environmental condition, such as weather and ambient light level.

9. The method according to claim 1, wherein the method further comprises the step of receiving the previous display view setting and/or the display view setting from at least one other vehicle, an external database, a cloud-based service, a database of the vehicle.

10. The method according to claim 1, wherein the display view setting is based on a compiled set of previous display view settings from a plurality of other vision aid systems of other vehicles which has experienced the specific situation.

11. The method according to claim 1, wherein the vision aid system is of the vehicle and the display view is of the vehicle.

12. A vision aid system for a vehicle, comprising, a sensor system comprising at least one sensor for generating an image view of at least a portion of a surrounding of the vehicle, at least one display unit for displaying the image view, and a control unit configured to perform the steps of the method according to claim 1.

13. The vision aid system according to claim 12, wherein the sensor system is a three-dimensional sensor system for generating a three-dimensional image of at least a portion of the surrounding of the vehicle, preferably a 360 degrees three-dimensional image around the vehicle.

14. The vision aid system according to claim 12, further comprising a communication unit configured for receiving and/or transmitting display view settings, preferably in the form of a wireless receiver and/or transmitter.

15. A vehicle comprising the vision aid system according to claim 12.

16. The vehicle according to claim 15, wherein the vehicle is a commercial vehicle, such as any one of a truck, such as a heavy duty truck, a construction equipment vehicle and a bus.

17. A method for receiving and transmitting display view settings to a fleet of vehicles having vision aid systems, wherein the vision aid system comprises a display unit for a user of the vehicle, the display unit being configured for presenting at least one display view to a user of the vehicle, the display view representing an image view of at least a portion of the surrounding of the vehicle, the method comprising the following steps: receiving the at least one display view setting from at least one vehicle, which at least one display view setting is associated with a specific situation for the at least one vehicle, transmitting the at least one display view setting with the associated specific situation to at least one other vehicle, wherein the at least one other vehicle can adjust a display view of its vision aid system in accordance with the at least one display view setting when it is identified that the at least one other vehicle is experiencing the specific situation, the at least one display view setting being a setting of the display view identifying the image view that is presented to the user of the vehicle.

18. A system for receiving and transmitting display view settings to a fleet of vehicles, comprising, means for receiving and transmitting display view settings, a control unit configured to perform the steps of the method in claim 16.

19. A non-transitory computer readable medium carrying a computer program product comprising program code for performing the steps of claim 1, when said program product is run on a computer.

* * * * *